US012069728B2

(12) United States Patent
Xue et al.

(10) Patent No.: US 12,069,728 B2
(45) Date of Patent: Aug. 20, 2024

(54) TECHNIQUES FOR EARLY TERMINATION SIGNALING FOR RANDOM ACCESS RESPONSE WINDOWS

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Ozcan Ozturk, San Diego, CA (US); Jing Lei, San Diego, CA (US); Linhai He, San Diego, CA (US); Yi Huang, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 16/947,362

(22) Filed: Jul. 29, 2020

(65) Prior Publication Data

US 2021/0105823 A1 Apr. 8, 2021

Related U.S. Application Data

(60) Provisional application No. 62/909,599, filed on Oct. 2, 2019.

(51) Int. Cl.
*H04W 72/00* (2023.01)
*H04L 1/00* (2006.01)
(Continued)

(52) U.S. Cl.
CPC ....... *H04W 74/0833* (2013.01); *H04L 1/0061* (2013.01); *H04W 24/08* (2013.01); *H04W 52/0229* (2013.01); *H04W 72/23* (2023.01)

(58) Field of Classification Search
CPC .......... H04W 74/04–08; H04W 56/00; H04W 52/02; H04W 88/02; H04W 88/08
See application file for complete search history.

(56) References Cited

U.S. PATENT DOCUMENTS

2018/0070382 A1\* 3/2018 Lee .......................... H04B 7/26
2018/0077729 A1 3/2018 Lee et al.
(Continued)

FOREIGN PATENT DOCUMENTS

WO WO2013042908 A1 \* 1/2013 ............ H04W 74/08
WO WO2013042908 \* 3/2013 ............ H04W 74/08
(Continued)

OTHER PUBLICATIONS

International Search Report and Written Opinion—PCT/US2020/044205—ISA/EPO—Sep. 28, 2020.

*Primary Examiner* — Abdelillah Elmejjarmi
(74) *Attorney, Agent, or Firm* — Dalei Dong; Harrity & Harrity, LLP

(57) ABSTRACT

Various aspects of the present disclosure generally relate to wireless communication. In some aspects, a base station (BS) may attempt to receive one or more random access channel (RACH) messages from one or more user equipment (UEs); and transmit, based at least in part on the determination of a completion of processing of any received RACH messages of the one or more RACH messages, an early termination message to a UE to terminate a random access response window. In some aspects, a UE may transmit another RACH message as a response to receiving the early termination message. Numerous other aspects are provided.

30 Claims, 7 Drawing Sheets

(51) Int. Cl.
    *H04W 24/08*     (2009.01)
    *H04W 52/02*     (2009.01)
    *H04W 72/23*     (2023.01)
    *H04W 74/0833*     (2024.01)

(56) References Cited

U.S. PATENT DOCUMENTS

| | | | |
|---|---|---|---|
| 2018/0279186 A1* | 9/2018 | Park | H04W 36/0077 |
| 2020/0100297 A1* | 3/2020 | Agiwal | H04W 52/50 |
| 2020/0187246 A1* | 6/2020 | Amuru | H04W 48/12 |
| 2020/0329503 A1* | 10/2020 | Da Silva | H04B 7/0695 |
| 2020/0344809 A1* | 10/2020 | Svedman | H04W 88/02 |
| 2021/0076416 A1* | 3/2021 | Shah | H04W 74/006 |
| 2021/0392700 A1* | 12/2021 | Ohseki | H04W 76/10 |

FOREIGN PATENT DOCUMENTS

| | | | | |
|---|---|---|---|---|
| WO | WO2013042908 A1 * | 3/2013 | | H04W 74/08 |
| WO | 2017146921 A1 | 8/2017 | | |

* cited by examiner

TECHNIQUES FOR EARLY TERMINATION SIGNALING FOR RANDOM ACCESS RESPONSE WINDOWS

CROSS-REFERENCE TO RELATED APPLICATION

This Patent Application claims priority to U.S. Provisional Patent Application No. 62/909,599, filed on Oct. 2, 2019, entitled "TECHNIQUES FOR EARLY TERMINATION SIGNALING FOR RANDOM ACCESS RESPONSE WINDOWS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for early termination signaling for random access response windows.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station (BS), may include attempting to receive one or more random access channel (RACH) messages from one or more user equipment (UEs); and transmitting, based at least in part on the determination of a completion of processing of any received RACH messages of the one or more RACH messages, an early termination message to a UE to terminate a random access response window.

In some aspects, the method includes receiving the one or more RACH messages; processing the one or more RACH messages; determining, before an end of a random access response window, a completion of the processing of the one or more RACH messages; and transmitting the early termination message to the UE based at least in part on the completion of the processing of the one or more RACH messages. In some aspects, the early termination message is a broadcast over-the-air (OTA) message or a multi-cast OTA message. In some aspects, the one or more RACH messages include a RACH message type-1 (msg1) or a RACH message type-A (msgA). In some aspects, the early termination message is at least one of a downlink control information (DCI) including a cyclic redundancy check (CRC), a DCI conveyed in a search space of a random access radio network temporary identifier, a group-common DCI, a field of the group-common DCI, a sequence with a threshold processing gain, or a media access control payload of another RACH. In some aspects, transmitting the early termination message includes determining that the one or more RACH messages are not received on a first cell or first RAT and transmitting the early termination message on a second cell or second RAT to trigger the UE to transmit another RACH message on the first cell or first RAT.

In some aspects, the early termination message is a wake-up signal for the UE. In some aspects, transmitting the early termination message includes transmitting the early termination message based at least in part on whether a threshold level of control capacity is available for transmission of the early termination message. In some aspects, transmitting the early termination message includes transmitting the early termination message based at least in part on whether another message with a higher prioritization than the early termination message is scheduled for transmission. In some aspects, transmitting the early termination message includes transmitting the early termination message based at least in part on a UE capability of the UE.

In some aspects, the early termination message applies to one or more RACH opportunities identified implicitly based at least in part on a time at which the early termination message is sent and a configured processing delay. In some aspects, the configured processing delay is signaled via at least one of a radio resource control message, a remaining minimum system information message, or the early termination message. In some aspects, the configured processing delay is signaled via the early termination message to override a default value for the configured processing delay. In some aspects, the early termination message applies with one or more explicitly identified RACH opportunities identified explicitly in the early termination message.

In some aspects, the early termination message applies to a particular prioritization of the UE of a plurality of possible prioritizations of the UE. In some aspects, the early termination message applies to one or more RACH opportunities identified implicitly based at least in part on quasi-co-location information of the early termination message. In some aspects, the early termination message includes information identifying at least one of: one or more preamble indices of one or more UEs to which the early termination message applies. In some aspects, the random access response window is a complementary random access response window occurring after a basic random access response window.

In some aspects, a method of wireless communication, performed by a UE, may include transmitting a first RACH message; receiving, before a scheduled end to a random access response window, an early termination message; and transmitting a second RACH message based at least in part on the receipt of the early termination message.

In some aspects, the early termination message is a broadcast OTA message or a multi-cast OTA message. In some aspects the one or more RACH messages includes a msg1 or a msg3. In some aspects, the early termination message is at least one of a DCI including a CRC, a DCI conveyed in a search space of a random access radio network temporary identifier, a group-common DCI, a field of the group-common DCI, a sequence with a threshold processing gain, or a media access control payload of another random access message.

In some aspects, receiving the early termination message includes receiving the early termination message on a first cell or first RAT and transmitting the second RACH message on a second cell or second RAT. In some aspects, the early termination message is a wake-up signal for the UE. In some aspects, transmitting the second RACH message includes transmitting the second RACH message based at least in part on whether a configured timing window is expired. In some aspects, the method includes determining to end monitoring for a random access response message based at least in part on receiving the early termination message.

In some aspects, the early termination message applies to one or more RACH opportunities identified implicitly based at least in part on a time at which the early termination message is sent and a configured processing delay. In some aspects, the configured processing delay is signaled via at least one of a radio resource control message, a remaining minimum system information message, or the early termination message. In some aspects, the configured processing delay is signaled via the early termination message to override a default value for the configured processing delay. In some aspects, the early termination message applies with one or more explicitly identified RACH opportunities identified explicitly in the early termination message.

In some aspects, the early termination message applies to a particular prioritization of the UE of a plurality of possible prioritizations of the UE. In some aspects, the early termination message applies to one or more RACH opportunities identified implicitly based at least in part on quasi-co-location information of the early termination message. In some aspects, the early termination message includes information identifying a number of RACH messages pending for one or more RACH opportunities to which the early termination message applies. In some aspects, the random access response window is a complementary random access response window.

In some aspects, a BS for wireless communication may include memory and one or more processors operatively coupled to the memory. The memory and the one or more processors may be configured to attempt to receive one or more RACH messages from one or more UEs; and transmit, based at least in part on the determination of a completion of processing of any received RACH messages of the one or more RACH messages, an early termination message to a UE to terminate a random access response window.

In some aspects, a UE for wireless communication may include memory and one or more processors operatively coupled to the memory. The memory and the one or more processors may be configured to transmit a first RACH message; receive, before a scheduled end to a random access response window, an early termination message; and transmit a second RACH message based at least in part on the receipt of the early termination message.

In some aspects, a non-transitory computer-readable medium may store one or more instructions for wireless communication. The one or more instructions, when executed by one or more processors of a BS, may cause the one or more processors to: attempt to receive one or more RACH messages from one or more UEs; and transmit, based at least in part on the determination of a completion of processing of any received RACH messages of the one or more RACH messages, an early termination message to a UE to terminate a random access response window.

In some aspects, a non-transitory computer-readable medium may store one or more instructions for wireless communication. The one or more instructions, when executed by one or more processors of a UE, may cause the one or more processors to: transmit a first RACH message; receive, before a scheduled end to a random access response window, an early termination message; and transmit a second RACH message based at least in part on the receipt of the early termination message.

In some aspects, an apparatus for wireless communication may include means for attempting to receive one or more RACH messages from one or more UEs; and means for transmitting, based at least in part on the determination of a completion of processing of any received RACH messages of the one or more RACH messages, an early termination message to a UE to terminate a random access response window.

In some aspects, an apparatus for wireless communication may include means for transmitting a first RACH message; means for receiving, before a scheduled end to a random access response window, an early termination message; and means for transmitting a second RACH message based at least in part on the receipt of the early termination message.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
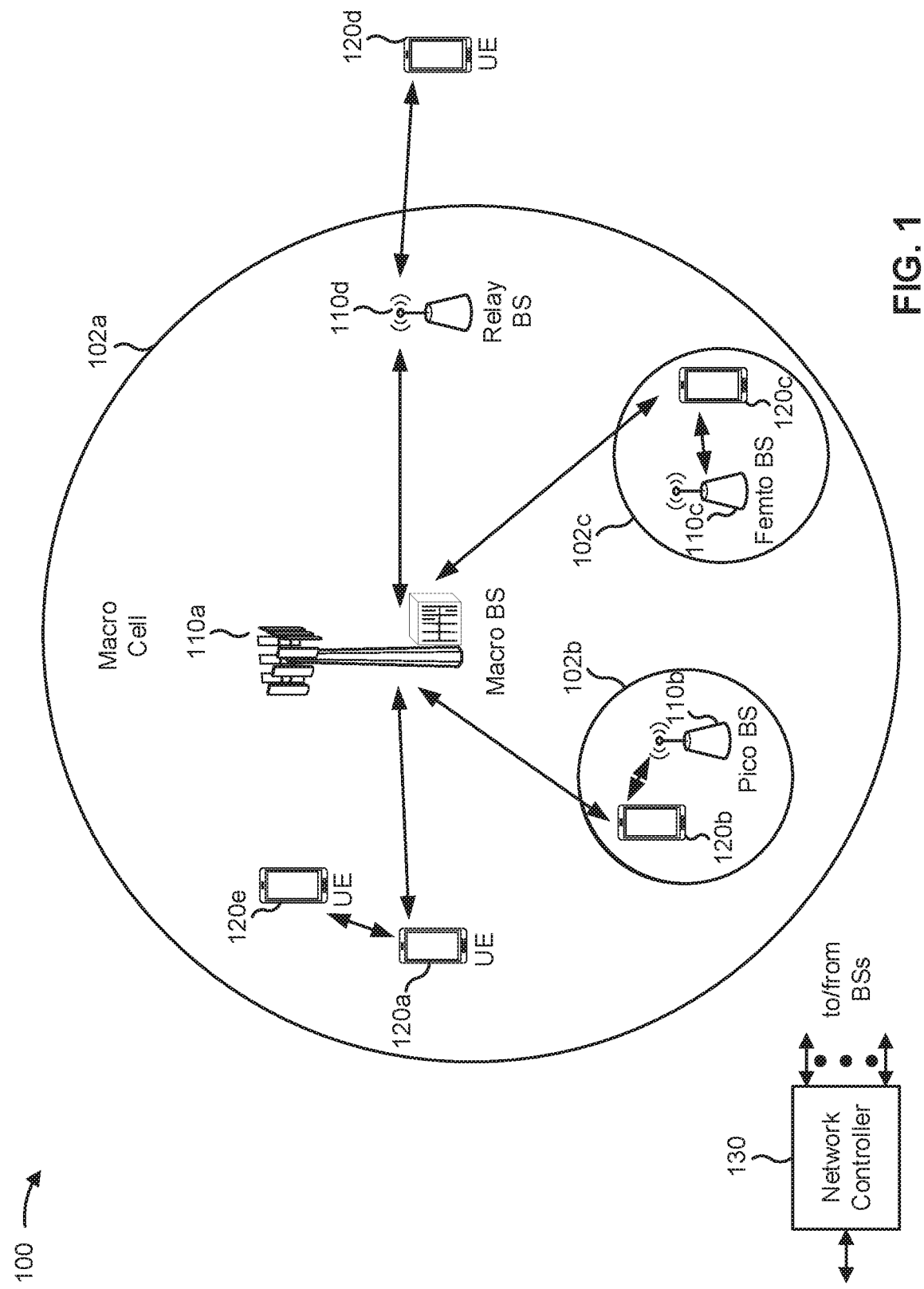
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
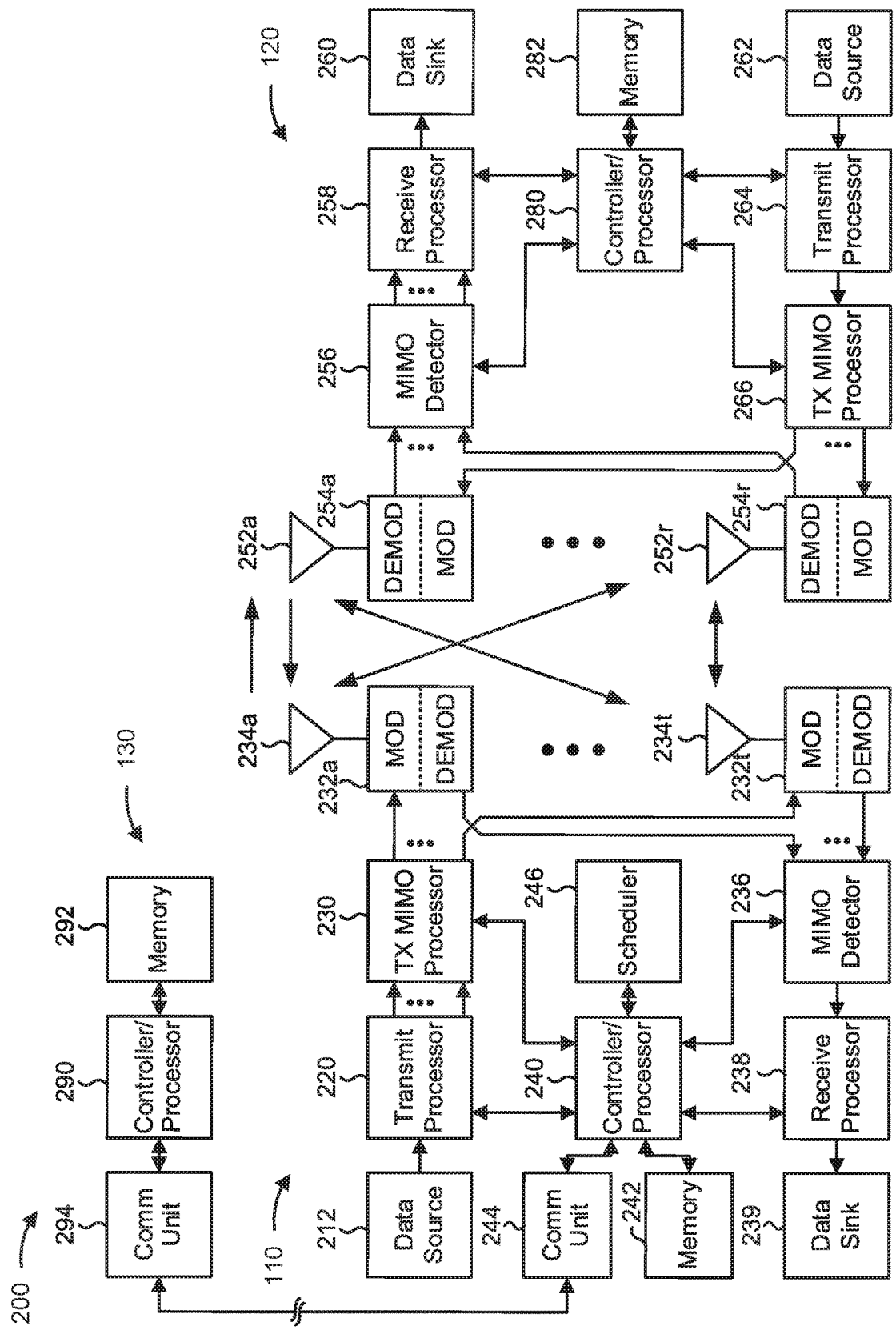
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with early termination signaling for random access response windows, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 600 of FIG. 6, and/or other processes as described herein. A scheduler 246 may schedule UEs for data transmission on the downlink and/or uplink.

In some aspects, base station 110 may include means for attempting to receive one or more random access channel (RACH) messages from one or more UEs, means for transmitting, based at least in part on the determination of a completion of processing of any received RACH messages of the one or more RACH messages, an early termination message to a UE to terminate a random access response window, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for transmitting a first RACH message, means for receiving, before a scheduled end to a random access response window, an early termination message, means for transmitting a second RACH message based at least in part on the receipt of the early termination message, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some communications systems, such as NR, a UE may perform a random access channel (RACH) procedure to obtain or regain connectivity with a BS. The RACH procedure may involve a multi-step handshake. In such a multi-step handshake procedure (e.g., a 4-step handshake procedure, a 2-step handshake procedure, and/or the like), the UE may transmit, during resources allocated for RACH transmission, a first RACH message (e.g., a RACH message type-1 (msg1) in a 4-step handshake procedure or a RACH message type-A (msgA) in a 2-step handshake procedure) to initiate the RACH procedure. The UE may attempt to search for a RACH response message from the BS based at least in part on transmitting the first RACH message. In this case, a period of time during which the UE attempts to receive the RACH response message from the BS may be defined as a random access response window. In this case, when the UE does not receive a RACH response message during the random access response window, the UE may determine that the BS did not receive the first RACH message and may transmit a second RACH message (e.g., another msg1 or another msgA) to re-attempt to initiate the RACH procedure.

A size of the random access response window may affect various network communications performance metrics. For example, a larger random access response window may reduce a likelihood that a delay in receiving a RACH response message results in the UE transmitting the second RACH message before successfully receiving the RACH response message for the first RACH message, thereby reducing network utilization. In contrast, a smaller random access response window may reduce a latency associated with transmitting the second RACH message when the first RACH message fails. Moreover, a smaller random access response window may reduce UE power consumption associated with monitoring to receive the RACH response message.

However, a smaller random access response window may not be feasible when physical downlink control channel (PDCCH) or physical downlink shared channel (PDSCH) resources are not available for conveying RACH response messages at a periodicity corresponding to the smaller random access response window. Moreover, a larger random access response window may better handle a listen-before-talk (LBT) uncertainty scenario in unlicensed spectrum where a BS may delay transmitting the RACH response message to determine a channel occupancy time (COT). Another example of a scenario where a larger random access response window may be beneficial is where a radio resource control (RRC) message is conveyed by the RACH response message (e.g., a RACH message type-B (msgB) in a 2-step handshake procedure). In this case, the random access response window may be greater than 40 milliseconds (ms) to account for downlink resource usage. One other example of a scenario where a larger random access response window may be beneficial is for mid-tier NR device deployments (e.g., MTC, wearable devices, and/or the link in NR-light networks). In this case, UEs (e.g., mid-tier NR devices) may be assigned relatively small bandwidths, which may result in a longer period of time for a BS to transmit data (e.g., the RACH response message) to the UEs.

Some aspects described herein enable early termination of a random access response window, thereby enabling use of a larger random access response window, with the reduced latency and/or power consumption associated with a smaller random access response window. For example, a UE may transmit a first RACH message to the BS and the BS may attempt to receive the first RACH message and other RACH messages from other UEs. The BS may process any other received RACH messages and, based at least in part on determining that at least one RACH message is not received using resources allocated for RACH transmission, transmit an early termination message.

In this case, the BS may transmit the early termination message to the UE to indicate that the first RACH message was not received and that the random access response window is to be terminated. Based at least in part on receiving the early termination indication, the UE may transmit the second RACH message without waiting for a time to expire on the random access response window. In this way, the BS and the UE enable reduced latency and/or power utilization associated with waiting for a random access response window to end by enabling early termination of the random access response window.

Figure 3:
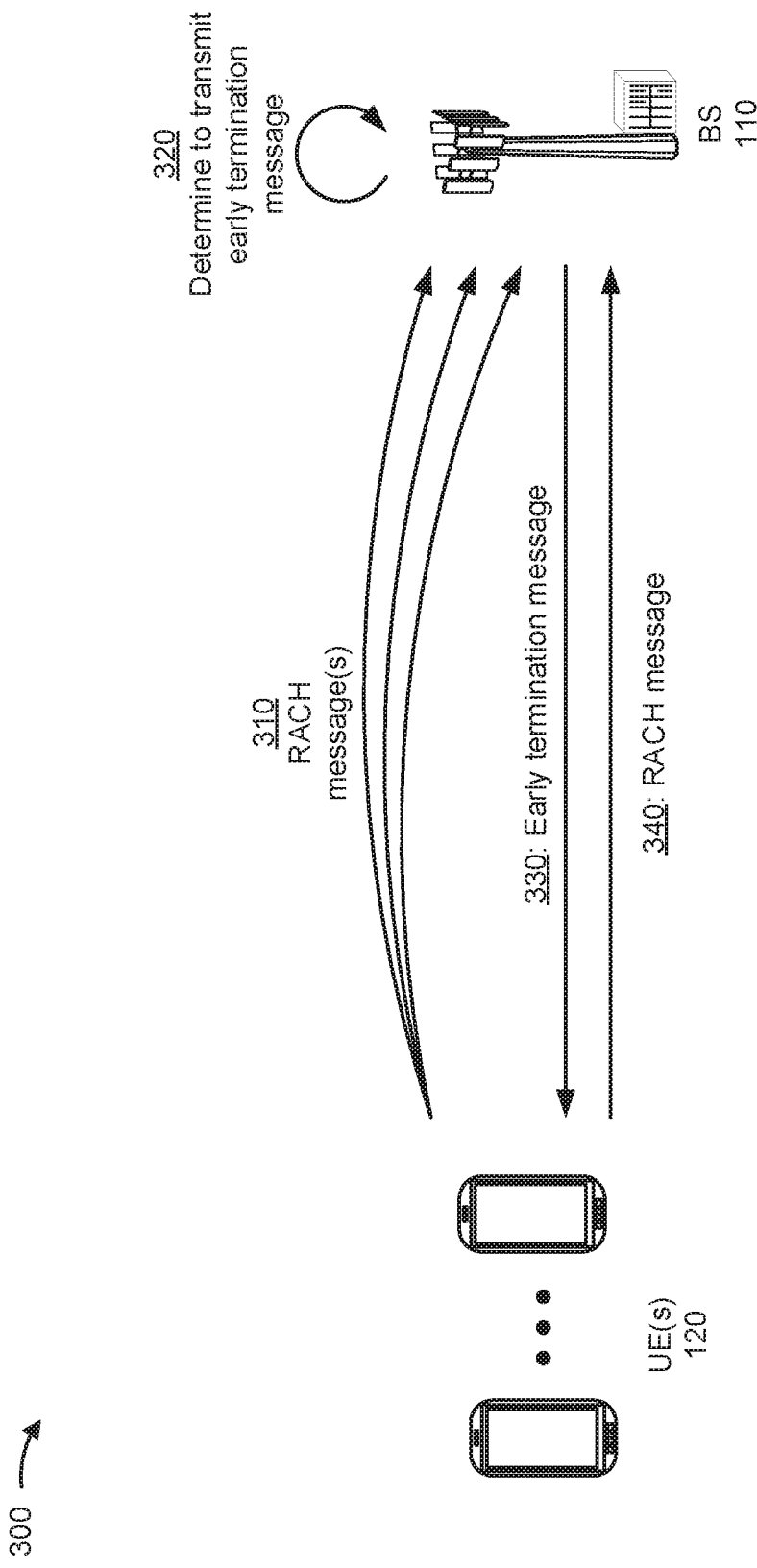
FIG. 3 is a diagram illustrating an example of early termination signaling, in accordance with various aspects of the present disclosure.

FIG. 3 is a diagram illustrating an example 300 of early termination signaling, in accordance with various aspects of the present disclosure. As shown in FIG. 3, example 300 includes a BS 110 and one or more UEs 120.

As further shown in FIG. 3, and by reference number 310, one or more UEs 120 may transmit one or more RACH messages to BS 110. For example, a UE 120 may transmit a first RACH message to BS 110. In this case, BS 110 may not receive the first RACH message. In some aspects, BS 110 may not receive any RACH messages (e.g., msg1 or msgA). For example, as a result of an interference condition, BS 110 may fail to receive any RACH messages transmitted by any UEs 120. Additionally, or alternatively, BS 110 may receive a subset of RACH messages transmitted by the one or more UEs 120. For example, BS 110 may receive a first one or more RACH messages transmitted by a first one or more UEs 120 and may not receive a second one or more RACH messages transmitted by a second one or more UEs 120 (e.g., and for which BS 110 allocated resources for transmission).

As further shown in FIG. 3, and by reference number 320, BS 110 may determine to transmit an early termination message. For example, BS 110 may determine that a triggering event has occurred to cause BS 110 to transmit the early termination message. In some aspects, BS 110 may determine to transmit the early termination message based at least in part on determining that processing is complete for any received RACH messages. For example, BS 110 may process a first one or more RACH messages and may, after completing processing of the first one or more RACH messages, determine to transmit an early termination message to trigger retransmission of a second one or more RACH messages.

Additionally, or alternatively, BS 110 may determine to transmit the early termination message based at least in part on not receiving one or more RACHs. For example, BS 110 may receive RACHs from a first one or more UEs 120 and may fail to receive RACHs from a second one or more UEs 120. Additionally, or alternatively, BS 110 may fail to receive RACHs from any UEs 120. Additionally, or alternatively, BS 110 may determine to transmit the early termination message based at least in part on a channel quality metric. For example, based at least in part on determining that a channel quality (e.g., an RSRP, an RSRQ, and/or the like) is less than a threshold, BS 110 may determine to transmit the early termination message (e.g., even without having received any RACH messages).

As further shown in FIG. 3, and by reference number 330, BS 110 may transmit the early termination message to one or more UEs 120. For example, BS 110 may transmit the early termination message to all of the one or more UEs, a subset of the one or more UEs 120 (e.g., for which a RACH message was not received), and/or the like. In some aspects, BS 110 may transmit the early termination message to convey information to a UE 120. For example, BS 110 may transmit the early termination message as a broadcast or multi-cast over-the-air (OTA) message to indicate that a first RACH message of a RACH procedure (e.g., msg1 or msgA) was not received to enable UE 120 to terminate searching for a RACH response message and transmit a second RACH message (e.g., msg1 or a RACH message type 3 (msg3)). In this case, BS 110 may convey the early termination message using a downlink control information (DCI) with a cyclic redundancy check (CRC). In some aspects, BS 110 may convey the DCI using the same search space as BS 110 uses for a random access radio network temporary identifier (RA-RNTI). In this case, BS 110 enables UE 120 to monitor for both the early termination message and the RA-RNTI concurrently, thereby reducing processing complexity and/or power consumption relative to UE 120 monitoring two different search spaces.

In some aspects, BS 110 may use a dedicated type of DCI for the early termination message. For example, BS 110 may use a group-common DCI with a radio network temporary identifier (RNTI) that is RRC configured in, for example, a remaining minimum system information (RMSI). Additionally, or alternatively, BS 110 may use a field of a group-common DCI for identifying a slot format indicator to convey the early termination indicator. Additionally, or alternatively, BS 110 may convey the early termination message using another type of sequence with a threshold level of processing gain. In some aspects, BS 110 may use a media access control (MAC) payload to convey an OTA message, such as an early termination message. For example, BS 110 may embed the early termination message as a MAC payload of a RACH message type-2 (msg2) or a RACH message type-B (msgB). Additionally, or alternatively, BS 110 may include an OTA message, such as an early termination message, in a physical downlink control channel (PDCCH) msg2 or msgB.

In some aspects, BS 110 may transmit the early termination message using the same cell and/or the same radio access technology (RAT) on which BS 110 is to receive the RACH message. Additionally, or alternatively, BS 110 (or another BS 110 based at least in part on signaling from the BS 110) may transmit the early termination message on another cell and/or RAT that is different from a cell and/or RAT on which BS 110 is to receive the RACH message. In some aspects, BS 110 may use a wake-up signal radio interface and/or channel to transmit the early termination message. For example, BS 110 may transmit the early termination message using a wake-up signal channel of a 5G RAT, a Wi-Fi RAT, and/or the like.

In some aspects, BS 110 may transmit the early termination message based at least in part on a network characteristic. For example, BS 110 may determine whether a control capacity of a cell includes a threshold number of resources that is allocatable for the early termination message and/or other control information that is to be transmitted. Additionally, or alternatively, BS 110 may determine whether another control message with a higher priority is queued for transmission. In this case, BS 110 may delay and/or forgo transmission of the early termination message to enable transmission of a higher priority control message. In some aspects, BS 110 may define a priority for an OTA message, such as an early termination message. For example, BS 110 may define a relatively high priority to an early termination message for transmission to a relatively high priority UE 120 and a relatively low priority to an early termination message for transmission to a relatively low priority UE 120. In this case, BS 110 may partition random access resources at a sub-RACH occasion level and may use the partitioned random access resources to determine a priority of a UE 120.

Additionally, or alternatively, BS 110 may receive an uplink control information (UCI) or a physical uplink shared channel (PUSCH) (e.g., for a 2-step RACH procedure) from a UE 120 identifying a priority of the UE 120. In some aspects, BS 110 may determine a category-4 (CAT4) LBT priority for a channel occupancy time for transmitting a RACH message type-B (msgB) based at least in part on priority information, for a UE 120, conveyed in a UCI. For example, BS 110 may determine that a relatively low RACH priority for UE 120 corresponds to a relatively low CAT4 LBT priority for msgB for UE 120. In some aspects, BS 110 may convey responses to other low-priority msgAs in the same channel occupancy time as for a low-priority msgB. In some aspects, BS 110 may receive a msgA conveying UCI with a CAT4 LBT priority, a RACH priority, other information relating to channel occupancy time sharing and/or reservation, and/or the like. In some aspects, BS 110 may determine a priority based at least in part on a type of RACH procedure. For example, BS 110 may determine a relatively high priority CAT4 LBT for a UE 120 using a 2-step RACH procedure.

In some aspects, BS 110 may transmit the early termination message based at least in part on a UE characteristic. For example, BS 110 may determine whether any UEs 120 in a cell are associated with a capability of using the early termination message and may, based at least in part on determining that there are UEs capable of using the early termination message, transmit the early termination message. In this case, BS 110 may determine whether a UE 120 is capable of using the early termination message based at least in part on receiving a UE capability indicator from a UE 120. In some aspects, a UE 120 may not be configured to transmit the UE capability indicator until after an initial access procedure, so BS 110 may forgo transmitting the early termination message to the UE 120 at a first time (e.g., on a failure of receiving a RACH message during initial access RACH procedure), but may transmit the early termination message at a second time (e.g., on a failure of receiving a RACH message during another RACH procedure).

In some aspects, UE 120 may determine a RACH opportunity to which the early termination message (or any other OTA message from BS 110) applies. For example, OTA messages, such as the early termination message or other types of OTA messages, may implicitly associate with a RACH opportunity based at least in part on a time characteristic. In this case, an OTA message may apply to RACH opportunities occurring before a time t−τ, where t is a time at which the OTA message is transmitted and τ is a processing delay (τ>0). In this case, BS 110 may configure the processing delay using an RMSI transmitted to a UE 120. In some aspects, BS 110 may identify a dynamic processing delay in an OTA message, such as an early termination message. In this case, UE 120 may override a configured value for the processing delay (e.g., an RMSI or RRC configured value) with a dynamically indicated value for the processing delay.

In some aspects, the OTA message may apply to a type of handshake procedure, such as BS 110 indicating that an OTA message (e.g., the early termination message) applies to a 4-step RACH procedure, a 2-step RACH procedure, a combination thereof, and/or the like. In some aspects, the OTA message may identify a number of received or pending RACH messages associated with RACH opportunities to which the OTA message applies. For example, UE 120 may determine, based at least in part on the number of received or pending RACH messages, to use the same random access resources for retransmission of a RACH message triggering the OTA message. In some aspects, the OTA message may identify a preamble index, a list of random access prefixes, and/or the like. In this case, UE 120 may determine whether an early termination applies to UE 120 based at least in part on whether a random access prefix of UE 120 is included in the OTA message.

Additionally, or alternatively, BS 110 may explicitly signal a RACH occasion to which an OTA message is to apply. For example, BS 110 may include, in a field of an early termination signal, an indicator of a RACH occasion to which the early termination signal applies. In this case, BS 110 may indicate that the early termination message applies to a slot, a range of slots (e.g., a number of slots before the early termination message), an explicitly identified range of slots (e.g., an explicitly identified one or more RACH opportunities for which a RACH message is not received), and/or the like. Additionally, or alternatively, BS 110 may use quasi-co-location (QCL) information to indicate a RACH opportunity to which an OTA message applies. For example, UE 120 may determine that an early termination signal applies to a RACH opportunity based at least in part on the early termination signal being quasi-co-located with the RACH opportunity.

As further shown in FIG. 3, and by reference number 340, one or more UEs 120 may transmit a RACH message. For example, a UE 120 may transmit a second RACH message (e.g., after receiving the early termination message indicating that BS 110 did not receive a transmitted first RACH message). In this way, UE 120 re-initiates a RACH procedure with a reduced delay and power consumption relative to waiting for a timer period associated with the random access response window to end.

In some aspects, a UE 120 may determine that the early termination message applies to a random access response window and may transmit the second RACH message for the random access response window. For example, UE 120 may monitor a first random access response window (termed a 'basic' random access response window) that may be less than a threshold period of time and a second random access response window (termed a 'complementary' random access response window) that may be greater than the threshold period of time and may occur immediately after the first random access response window. In this case, UE 120 may attempt to receive the random access response message in the first random access response window without monitoring for an OTA message, such as an early termination message, thereby reducing processing resources and/or power consumption. Subsequently, when a random access response is not received, UE 120 may monitor the second random access response window and may monitor for the OTA message when monitoring the second random access response window, thereby enabling early termination of the second random access response window. In this case, when UE 120 receives the early termination message, UE 120 may transmit the second RACH message. Subsequently, UE 120 may return to monitoring the first random access response window or may return to monitoring the second random access response window based at least in part on a configuration.

In some aspects, UE 120 may perform another action in connection with receiving an early termination message. For example, after receiving the early termination message, UE 120 may continue to delay transmission of a second RACH message (e.g., as a result of a lack of network resources for transmitting the second RACH message), but may stop monitoring for a random access response message. In this way, UE 120 may reduce power consumption relative to continuing to monitor for the random access response message even after BS 110 indicated that a first RACH message is not received and, therefore, a RACH response message is not to be transmitted.

As indicated above, FIG. 3 is provided as an example. Other examples may differ from what is described with respect to FIG. 3.

Figure 4:
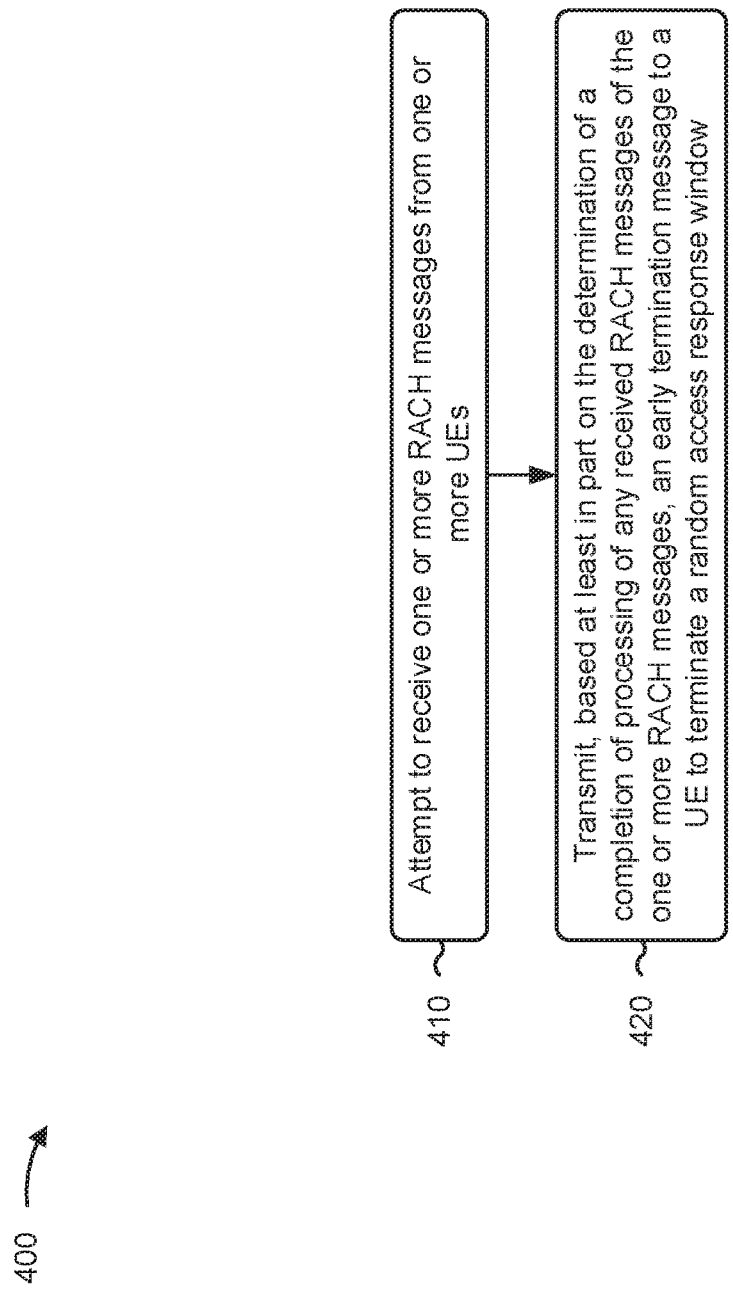
FIG. 4 is a diagram illustrating an example process performed, for example, by a base station, in accordance with various aspects of the present disclosure.

FIG. 4 is a diagram illustrating an example process 400 performed, for example, by a BS, in accordance with various aspects of the present disclosure. Example process 400 is an example where the BS (e.g., BS 110, apparatus 502, BS 750, and/or the like) performs operations associated with early termination signaling for random access response windows.

As shown in FIG. 4, in some aspects, process 400 may include attempting to receive one or more RACH messages from one or more UEs (block 410). For example, the BS (e.g., using transmit processor 220, receive processor 238, controller/processor 240, memory 242, and/or the like) may attempt to receive one or more RACH messages from one or more UEs, as described above.

As further shown in FIG. 4, in some aspects, process 400 may include transmitting, based at least in part on the determination of a completion of processing of any received RACH messages of the one or more RACH messages, an early termination message to a UE to terminate a random access response window (block 420). For example, the BS (e.g., using transmit processor 220, receive processor 238, controller/processor 240, memory 242, and/or the like) may transmit, based at least in part on the determination of a completion of processing of any received RACH messages of the one or more RACH messages, an early termination message to a UE to terminate a random access response window, as described above.

Process 400 may include additional aspects, such as any single aspect or any combination of aspects described below and/or in connection with one or more other processes described elsewhere herein.

In a first aspect, process 400 includes receiving the one or more RACH messages; processing the one or more RACH messages; determining, before an end of a random access response window, a completion of the processing of the one or more RACH messages; and transmitting the early termination message to the UE based at least in part on the completion of the processing of the one or more RACH messages.

In a second aspect, alone or in combination with the first aspect, the early termination message is a broadcast OTA message or a multi-cast OTA message.

In a third aspect, alone or in combination with one or more of the first and second aspects, the one or more RACH messages include a msg1 or msgA.

In a fourth aspect, alone or in combination with one or more of the first through third aspects, the early termination message is at least one of a DCI including a CRC, a DCI conveyed in a search space of a random access radio network temporary identifier, a group-common DCI, a field of the group-common DCI, a sequence with a threshold processing gain, or a media access control payload of another RACH.

In a fifth aspect, alone or in combination with one or more of the first through fourth aspects, transmitting the early termination message includes determining that the one or more RACH messages are not received on a first cell or first RAT and transmitting the early termination message on a second cell or second RAT to trigger the UE to transmit another RACH message on the first cell or first RAT.

In a sixth aspect, alone or in combination with one or more of the first through fifth aspects, the early termination message is a wake-up signal for the UE.

In a seventh aspect, alone or in combination with one or more of the first through sixth aspects, transmitting the early termination message includes transmitting the early termination message based at least in part on whether a threshold level of control capacity is available for transmission of the early termination message.

In an eighth aspect, alone or in combination with one or more of the first through seventh aspects, transmitting the early termination message includes transmitting the early termination message based at least in part on whether another message with a higher prioritization than the early termination message is scheduled for transmission.

In a ninth aspect, alone or in combination with one or more of the first through eighth aspects, transmitting the early termination message includes transmitting the early termination message based at least in part on a UE capability of the UE.

In a tenth aspect, alone or in combination with one or more of the first through ninth aspects, the early termination message applies to one or more RACH opportunities identified implicitly based at least in part on a time at which the early termination message is sent and a configured processing delay.

In an eleventh aspect, alone or in combination with one or more of the first through tenth aspects, the configured processing delay is signaled via at least one of a radio resource control message, a remaining minimum system information message, or the early termination message.

In a twelfth aspect, alone or in combination with one or more of the first through eleventh aspects, the configured processing delay is signaled via the early termination message to override a default value for the configured processing delay.

In a thirteenth aspect, alone or in combination with one or more of the first through twelfth aspects, the early termination message applies with one or more explicitly identified RACH opportunities identified explicitly in the early termination message.

In a fourteenth aspect, alone or in combination with one or more of the first through thirteenth aspects, the early termination message applies to a particular prioritization of the UE of a plurality of possible prioritizations of the UE.

In a fifteenth aspect, alone or in combination with one or more of the first through fourteenth aspects, the early termination message applies to one or more RACH opportunities identified implicitly based at least in part on quasi-co-location information of the early termination message.

In a sixteenth aspect, alone or in combination with one or more of the first through fifteenth aspects, the early termination message includes information identifying at least one of: one or more preamble indices of one or more UEs to which the early termination message applies.

In a seventeenth aspect, alone or in combination with one or more of the first through sixteenth aspects, the random access response window is a complementary random access response window occurring after a basic random access response window.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
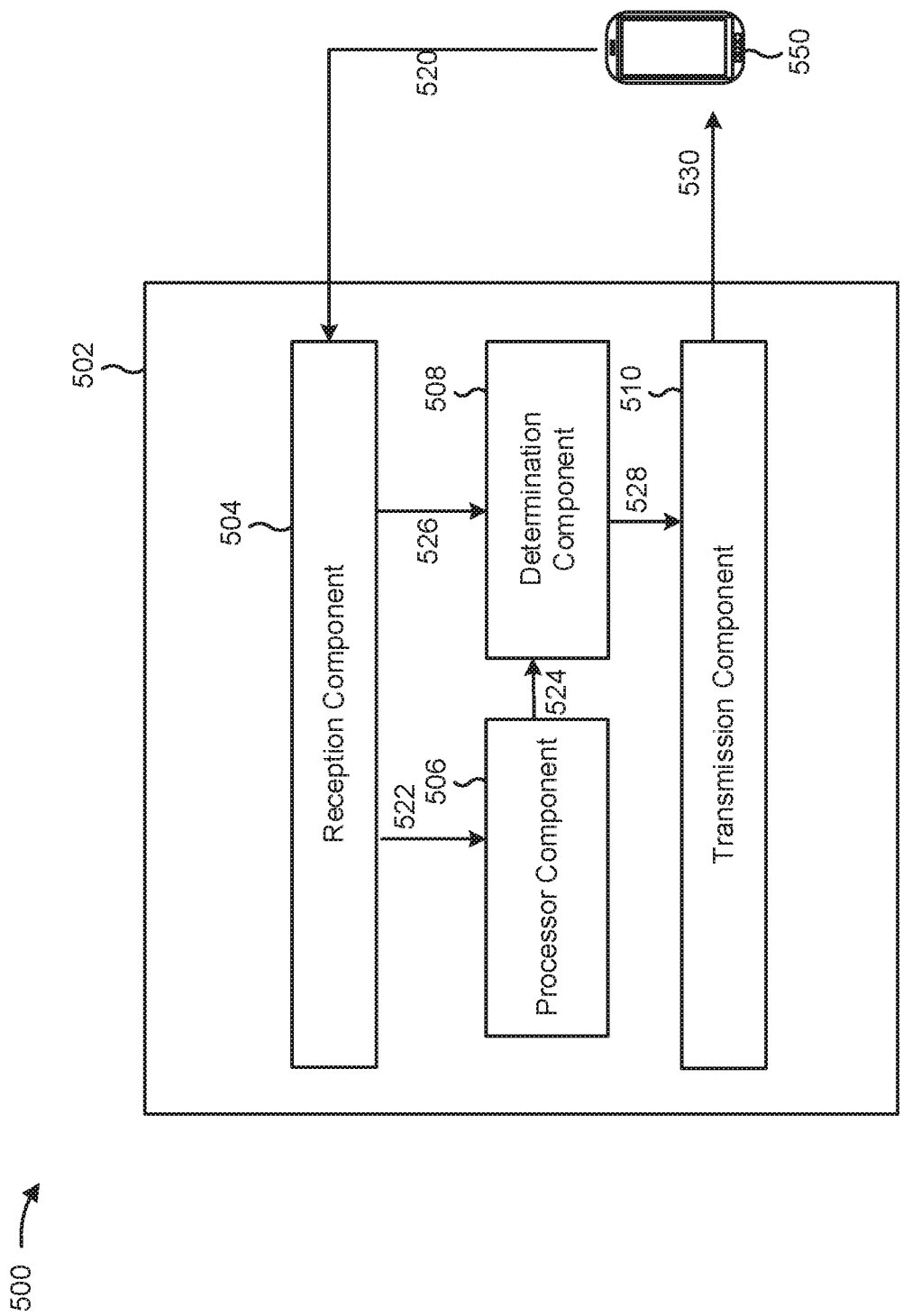
FIG. 5 is a conceptual data flow diagram illustrating the data flow between different modules/means/components in an example apparatus, in accordance with various aspects of the present disclosure.

FIG. 5 is a conceptual data flow diagram 500 illustrating the data flow between different modules/means/components in an example apparatus 502. The apparatus 502 may be a BS (e.g., BS 110). In some aspects, the apparatus 502 includes a reception component 504, a processor component 506, a determination component and/or a transmission component 510.

Reception component 504 may receive, from UE 550 and as data 520, information identifying a RACH message, a UE capability, and/or the like. For example, reception component 504 may receive RACH messages from some UEs 120 of a plurality of UEs 120, and may attempt to, but fail to receive RACH messages from other UEs 120 of the plurality of UEs 120. Additionally, or alternatively, reception component 504 may receive signaling identifying, for example, a UE capability, a UE priority, and/or the like.

Processing component 506 may receive, from reception component 504 and as data 522, RACH messages for processing. For example, processing component 506 may process received RACH messages and may indicate, to determination component 508 and as data 524, that processing is completed for the received RACH messages.

Determination component 508 may receive, from reception component 504 and as data 526, information indicating completion of processing of received RACH messages. In this case, determination component 508 may determine the completion of the processing, and may indicate, to transmission component 510 and as data 528, that transmission component 510 is to transmit an early termination message to UE 550, as data 530.

The apparatus 502 may include additional components that perform each of the blocks of the algorithm in the aforementioned process 400 of FIG. 4 and/or the like. Each block in the aforementioned process 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

Figure 6:
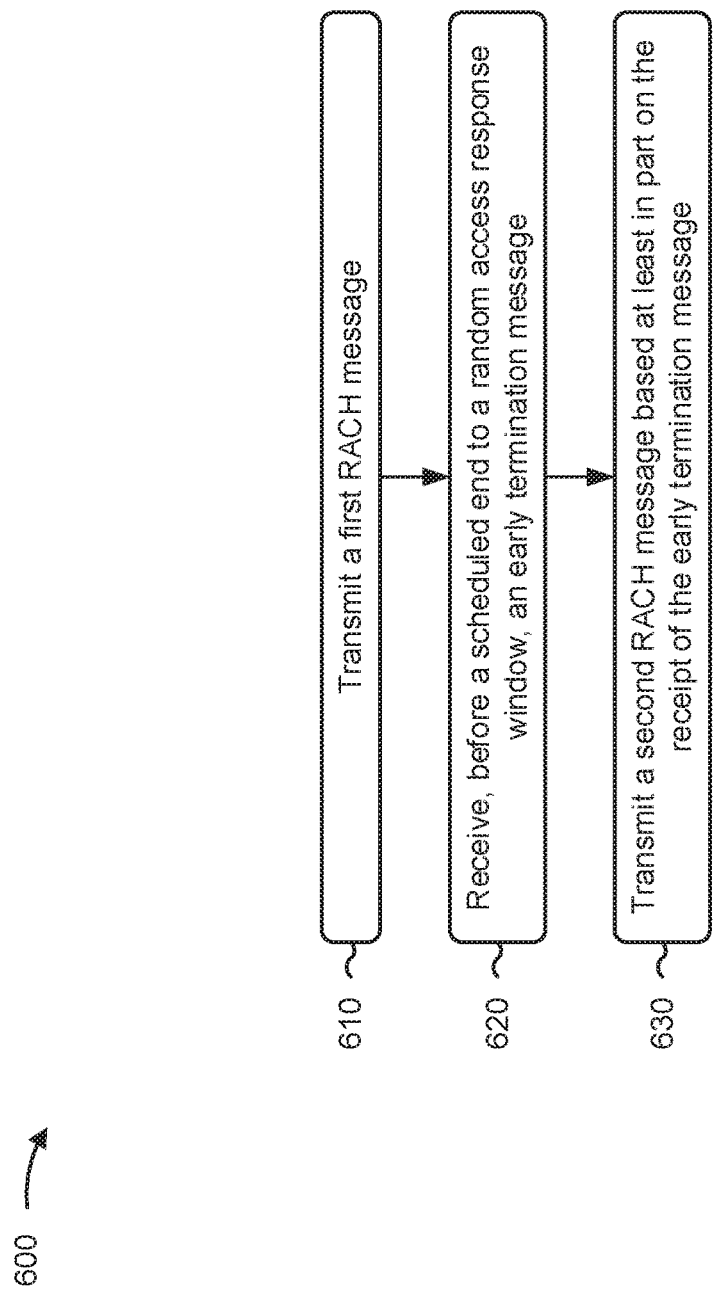
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120, UE 550, apparatus 702, and/or the like) performs operations associated with early termination signaling for random access response windows.

As shown in FIG. 6, in some aspects, process 600 may include transmitting a first RACH message (block 610). For example, the UE (e.g., using controller/processor 280, transmit processor 264, TX MIMO processor 266, MOD 254, antenna 252, and/or the like) may transmit a first RACH message, as described above.

As further shown in FIG. 6, in some aspects, process 600 may include receiving, before a scheduled end to a random access response window, an early termination message (block 620). For example, the UE (e.g., using antenna 252, DEMOD 254, MIMO detector 256, receive processor 258, controller/processor 280, and/or the like) may receive, before a scheduled end to a random access response window, an early termination message, as described above.

As further shown in FIG. 6, in some aspects, process 600 may include transmitting a second RACH message based at least in part on the receipt of the early termination message (block 630). For example, the UE (e.g., using controller/processor 280, transmit processor 264, TX MIMO processor 266, MOD 254, antenna 252, and/or the like) may transmit a second RACH message based at least in part on the receipt of the early termination message, as described above.

Process 600 may include additional aspects, such as any single aspect or any combination of aspects described below and/or in connection with one or more other processes described elsewhere herein.

In a first aspect, the early termination message is a broadcast OTA message or a multi-cast OTA message.

In a second aspect, alone or in combination with the first aspect, the one or more RACH messages includes a msg1 or msgA.

In a third aspect, alone or in combination with one or more of the first and second aspects, the early termination message is at least one of a DCI including a CRC, a DCI conveyed in a search space of a random access radio network temporary identifier, a group-common DCI, a field of the group-common DCI, a sequence with a threshold processing gain, or a media access control payload of another random access message.

In a fourth aspect, alone or in combination with one or more of the first through third aspects, receiving the early termination message includes receiving the early termination message on a first cell or first RAT and transmitting the second RACH message on a second cell or second RAT.

In a fifth aspect, alone or in combination with one or more of the first through fourth aspects, the early termination message is a wake-up signal for the UE.

In a sixth aspect, alone or in combination with one or more of the first through fifth aspects, transmitting the second RACH message includes transmitting the second RACH message based at least in part on whether a configured timing window is expired.

In a seventh aspect, alone or in combination with one or more of the first through sixth aspects, process 600 includes determining to end monitoring for a random access response message based at least in part on receiving the early termination message.

In an eighth aspect, alone or in combination with one or more of the first through seventh aspects, the early termination message applies to one or more RACH opportunities identified implicitly based at least in part on a time at which the early termination message is sent and a configured processing delay.

In a ninth aspect, alone or in combination with one or more of the first through eighth aspects, the configured processing delay is signaled via at least one of a radio resource control message, a remaining minimum system information message, or the early termination message.

In a tenth aspect, alone or in combination with one or more of the first through ninth aspects, the configured processing delay is signaled via the early termination message to override a default value for the configured processing delay.

In an eleventh aspect, alone or in combination with one or more of the first through tenth aspects, the early termination message applies with one or more explicitly identified RACH opportunities identified explicitly in the early termination message.

In a twelfth aspect, alone or in combination with one or more of the first through eleventh aspects, the early termination message applies to a particular prioritization of the UE of a plurality of possible prioritizations of the UE.

In a thirteenth aspect, alone or in combination with one or more of the first through twelfth aspects, the early termination message applies to one or more RACH opportunities identified implicitly based at least in part on quasi-co-location information of the early termination message.

In a fourteenth aspect, alone or in combination with one or more of the first through thirteenth aspects, the early termination message includes information identifying a number of RACH messages pending for one or more RACH opportunities to which the early termination message applies.

In a fifteenth aspect, alone or in combination with one or more of the first through fourteenth aspects, the random access response window is a complementary random access response window.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
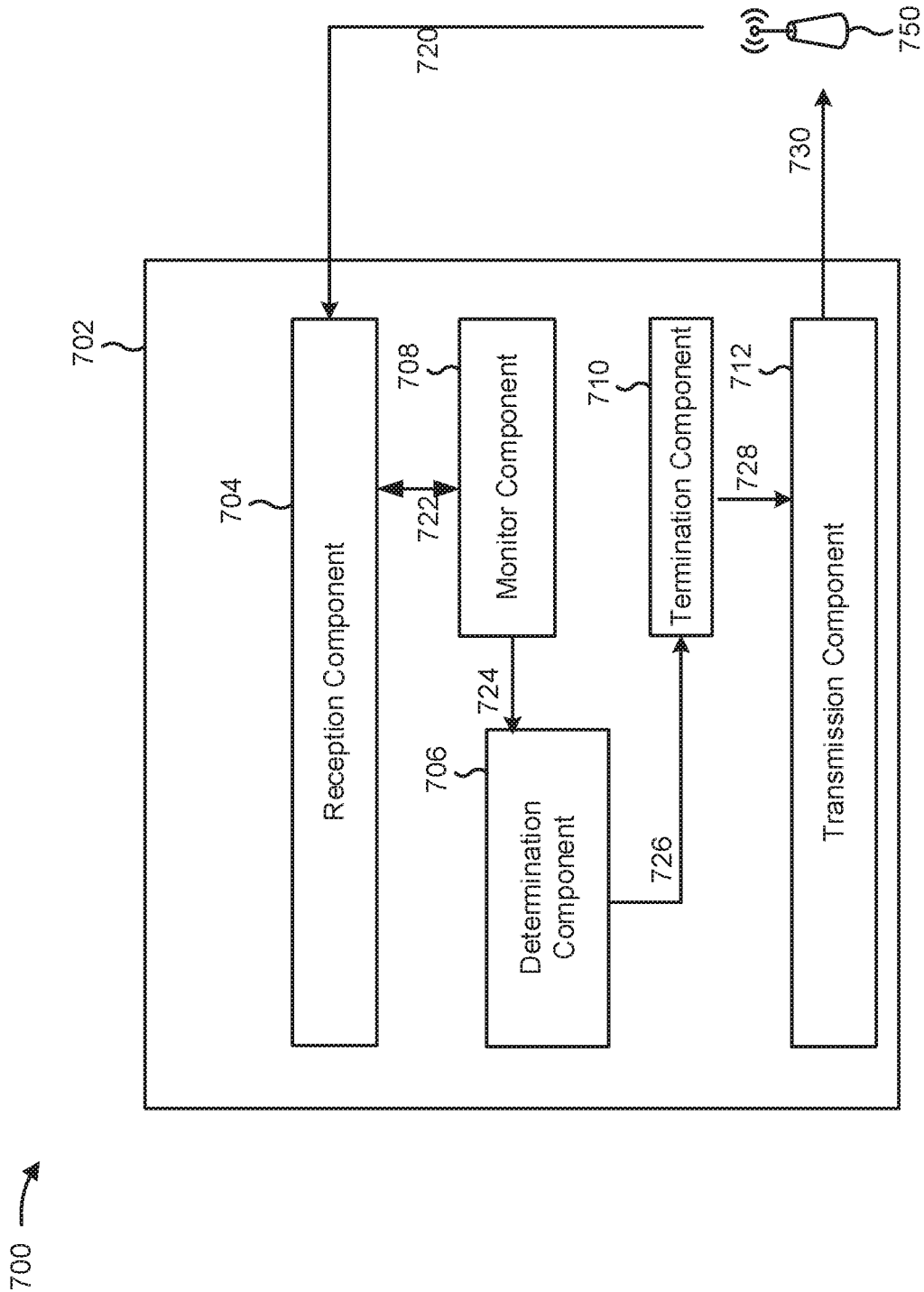
FIG. 7 is a conceptual data flow diagram illustrating the data flow between different modules/means/components in an example apparatus, in accordance with various aspects of the present disclosure.

FIG. 7 is a conceptual data flow diagram 700 illustrating the data flow between different modules/means/components in an example apparatus 702. The apparatus 702 may be a UE (e.g., UE 120). In some aspects, the apparatus 702 includes a reception component 704, a determination component 706, a monitor component 708, a termination component 710, and/or a transmission component 712.

Reception component 704 may receive, from BS 750 and as data 720, information identifying an early termination signal. For example, after the apparatus 702 transmits a first RACH signal, monitor component 708 may provide, to BS 750 and as data 722, information associated with causing reception component 704 to monitor for a RACH response message, an OTA signal (e.g., an early termination message, and/or the like).

In this case, based at least in part on reception component 704 indicating to monitor component a reception of an early termination signal, monitor component 708 may provide data 724 to determination component 706. Determination component 706 may determine to terminate the random access response window and may provide, to termination component 710 and as data 726, information to cause termination component 710 to early terminate a random access response window. In this case, termination component 710 may provide, to transmission component 712 and as data 728, data associated with causing transmission component 712 to transmit a second RACH message to BS 750, as data 730.

The apparatus 702 may include additional components that perform each of the blocks of the algorithm in the aforementioned process 600 of FIG. 6 and/or the like. Each block in the aforementioned process 600 of FIG. 6 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network node, comprising:
   attempting to receive a plurality of random access channel (RACH) messages from one or more user equipment (UEs);
   processing one or more received RACH messages of the plurality of RACH messages; and
   transmitting, based at least in part on a completion of the processing of the one or more received RACH messages, whether a threshold level of control capacity is available for transmission of an early termination message, and failing to receive another RACH message of the plurality of RACH messages, the early termination message to at least one UE of the one or more UEs to terminate a random access response window.

2. The method of claim 1, further comprising:
   determining, before an end of the random access response window, the completion of the processing of the one or more received RACH messages.

3. The method of claim 1, wherein the early termination message is a broadcast over-the-air (OTA) message or a multi-cast OTA message.

4. The method of claim 1, wherein the plurality of RACH messages include a RACH message type-1 (msg1) or a RACH message type-A (msgA), and
   wherein the method further comprises:
      receiving the msg1 or the msgA after transmitting the early termination message.

5. The method of claim 1, wherein the early termination message is at least one of:
   a downlink control information (DCI) including a cyclic redundancy check (CRC),
   a DCI conveyed in a search space of a random access radio network temporary identifier,
   a group-common DCI,
   a field of the group-common DCI,
   a sequence with a threshold processing gain, or
   a media access control payload of another RACH.

6. The method of claim 1, further comprising:
   determining that the other RACH message is not received on a first cell or first radio access technology (RAT); and
   wherein transmitting the early termination message comprises:
      transmitting the early termination message on a second cell or second RAT to trigger the at least one UE to transmit the other RACH message on the first cell or first RAT.

7. The method of claim 1, wherein the early termination message is a wake-up signal for the at least one UE.

8. The method of claim 1, wherein transmitting the early termination message comprises:
   transmitting the early termination message based at least in part on whether another message with a higher prioritization than the early termination message is scheduled for transmission.

9. The method of claim 1, wherein transmitting the early termination message comprises:
   transmitting the early termination message based at least in part on a UE capability of the at least one UE.

10. The method of claim 1, wherein the early termination message applies to one or more RACH opportunities identified implicitly based at least in part on a time at which the early termination message is sent and a configured processing delay.

11. The method of claim 10, wherein the configured processing delay is signaled via at least one of a radio resource control message, a remaining minimum system information message, or the early termination message.

12. The method of claim 10, wherein the configured processing delay is signaled via the early termination message to override a default value for the configured processing delay.

13. The method of claim 1, wherein the early termination message applies with one or more explicitly identified RACH opportunities identified explicitly in the early termination message.

14. The method of claim 1, wherein the early termination message applies to a particular prioritization of the at least one UE of a plurality of possible prioritizations of the at least one UE.

15. A method of wireless communication performed by a user equipment (UE), comprising:
   transmitting a first random access channel (RACH) message;
   receiving, before a scheduled end to a random access response window, based on a completion of processing of the first RACH message, and based on whether a threshold level of control capacity is available for transmission of an early termination message, and based on a failure associated with a second RACH message, the early termination message,
      wherein the early termination message applies with one or more explicitly identified RACH opportunities identified explicitly in the early termination message; and
   transmitting a third RACH message based at least in part on the receiving the early termination message.

16. The method of claim 15, wherein the early termination message is a broadcast over-the-air (OTA) message or a multi-cast OTA message.

17. The method of claim 15, wherein the first RACH message or the third RACH message includes a RACH message type-1 (msg1) or a RACH message type-A (msgA).

18. The method of claim 15, wherein the early termination message is at least one of:
- a downlink control information (DCI) including a cyclic redundancy check (CRC),
- a DCI conveyed in a search space of a random access radio network temporary identifier,
- a group-common DCI,
- a field of the group-common DCI,
- a sequence with a threshold processing gain, or
- a media access control payload of another random access message.

19. The method of claim 15, wherein receiving the early termination message comprises:
- receiving the early termination message on a first cell or first RAT; and
- wherein transmitting the third RACH message comprises:
  - transmitting the third RACH message on a second cell or second RAT.

20. The method of claim 15, wherein the early termination message is a wake-up signal for the UE.

21. The method of claim 15, wherein transmitting the third RACH message comprises:
- transmitting the third RACH message based at least in part on whether a configured timing window is expired.

22. The method of claim 15, further comprising:
- determining to end monitoring for a random access response message based at least in part on receiving the early termination message.

23. The method of claim 15, wherein the early termination is a first early termination message; and
wherein the method further comprises:
- receiving a second early termination message,
  - wherein the second early termination message applies to one or more other RACH opportunities identified implicitly based at least in part on a time at which the second early termination message is sent and a configured processing delay.

24. The method of claim 23, wherein the configured processing delay is signaled via at least one of a radio resource control message, a remaining minimum system information message, or the second early termination message.

25. The method of claim 23, wherein the configured processing delay is signaled via the second early termination message to override a default value for the configured processing delay.

26. The method of claim 15, wherein the early termination message applies to a particular prioritization of the UE of a plurality of possible prioritizations of the UE.

27. A network node for wireless communication, comprising:
- one or more memories; and
- one or more processors coupled to the one or more memories, the one or more processors configured to:
  - attempt to receive a plurality of random access channel (RACH) messages from one or more user equipment (UEs);
  - process one or more received RACH messages of the plurality of RACH messages; and
  - transmit, based at least in part on a completion of the processing of the one or more received RACH messages, whether a threshold level of control capacity is available for transmission of an early termination message, and failing to receive another RACH message of the plurality of RACH messages, the early termination message to at least one UE of the one or more UEs to terminate a random access response window.

28. A user equipment (UE) for wireless communication, comprising:
- a one or more memories; and
- one or more processors coupled to the one or more memories, the one or more processors configured to:
  - transmit a first random access channel (RACH) message;
  - receive, before a scheduled end to a random access response window, based on a completion of processing of the first RACH message, and based on whether a threshold level of control capacity is available for transmission of an early termination message, and based on a failure associated with a second RACH message, the early termination message,
    wherein the early termination message applies with one or more explicitly identified RACH opportunities identified explicitly in the early termination message; and
  - transmit a third RACH message based at least in part on receiving the early termination message.

29. The network node of claim 27, wherein the one or more processors, to transmit the early termination message, are configured to:
- transmit the early termination message based at least in part on whether another message with a higher prioritization than the early termination message is scheduled for transmission.

30. The network node of claim 27, wherein the early termination message applies with one or more explicitly identified RACH opportunities identified explicitly in the early termination message.

* * * * *